(12) United States Patent
Kataoka et al.

(10) Patent No.: US 7,852,758 B2
(45) Date of Patent: Dec. 14, 2010

(54) ROUTE CONTROL METHOD OF LABEL SWITCH PATH

(75) Inventors: Kenji Kataoka, Yokohama (JP); Kazuhiro Kusama, Kawasaki (JP)

(73) Assignee: Hitachi Ltd., Tokyo (JP)

( * ) Notice: Subject to any disclaimer, the term of this patent is extended or adjusted under 35 U.S.C. 154(b) by 839 days.

(21) Appl. No.: 11/166,076

(22) Filed: Jun. 27, 2005

(65) Prior Publication Data

US 2006/0083251 A1 Apr. 20, 2006

(30) Foreign Application Priority Data

Oct. 20, 2004 (JP) .............................. 2004-305077

(51) Int. Cl.
  *G01R 31/08* (2006.01)
  *H04L 12/28* (2006.01)
(52) U.S. Cl. ................... 370/230; 370/237; 370/389; 370/392; 370/395.2; 370/400
(58) Field of Classification Search ................. 370/252, 370/230, 248, 409, 329, 342, 389, 392, 400
See application file for complete search history.

(56) References Cited

U.S. PATENT DOCUMENTS

| | | | | | |
|---|---|---|---|---|---|
| 4,905,233 | A * | 2/1990 | Cain et al. | .................. | 370/237 |
| 7,065,084 | B2 * | 6/2006 | Seo | .............................. | 370/392 |
| 7,126,907 | B2 * | 10/2006 | Carpini et al. | ............... | 370/218 |
| 7,639,606 | B2 * | 12/2009 | Taylor et al. | ................. | 370/228 |
| 2003/0053415 | A1 | 3/2003 | Balakrishnan et al. | | |
| 2003/0156541 | A1 * | 8/2003 | Haihong | ..................... | 370/235 |
| 2003/0193944 | A1 | 10/2003 | Sasagawa | | |
| 2004/0114595 | A1 * | 6/2004 | Doukai | ........................ | 370/389 |
| 2005/0013308 | A1 * | 1/2005 | Wybenga et al. | ............ | 370/396 |
| 2005/0063379 | A1 * | 3/2005 | Wybenga et al. | ............ | 370/389 |
| 2005/0220123 | A1 * | 10/2005 | Wybenga et al. | ............ | 370/400 |

FOREIGN PATENT DOCUMENTS

JP 11-154977 6/1999

(Continued)

OTHER PUBLICATIONS

Vanderhaegen, Mark. "From MPLS to GMPLS: Adopting an Evolution approach to Intelligent Core Networking", Feb. 19, 2003. Alcatel.*

(Continued)

*Primary Examiner*—Huy D Vu
*Assistant Examiner*—Brandon Renner
(74) *Attorney, Agent, or Firm*—Antonelli, Terry, Stout & Kraus, LLP.

(57) ABSTRACT

In generation of an MPLS path which extends over plural routing areas or generation of a GMPLS path of a single routing area, a path originating node cannot conduct route computation of the whole path. Therefore, where plural paths are generated, there is a problem that reliability and communication quality cannot be secured. In a label switch path generation processing intended for MPLS and GMPLS networks, a path originating node is provided with a unit for setting restricted link information in a label allocation request message and sending it, and a node having received the label allocation request message is provided with a unit for selecting another route, which does not pass through the restricted link according to the restricted link information, and generating a path.

7 Claims, 22 Drawing Sheets

FOREIGN PATENT DOCUMENTS

| | | |
|---|---|---|
| JP | 11-234337 | 8/1999 |
| JP | 2002-247084 | 8/2002 |
| JP | 2003-309595 | 10/2003 |

OTHER PUBLICATIONS

D. Awduche et al., (pp. 23-31), (online) Nov. 2001, RFC 3209, (search on Mar. 19, 2004, Internet, see http://www.ietf.org/rfc/rfc3209.txt?number=3209).

J.P. Lang et al., "RSVP-TE Extensions in support of End-to-End GMPLS-based Recovery (draft-ietf-ccamp-gmpls-recovery-e2e-signalings-03.txt)", (P24), (online), Feb. 2004, internet draft, (searched on Mar. 19, 2004, the Internet, see http://www.ietf.org/internet-drafts/draft-lang-ccamp-gmpls-recovery-e2e-signaling-03.txt>).

Hui, et al., "Fault management in MPLS networks", Computer Engineering and Design, vol. 25, No. 5, May 2004, pp. 746-749 and 799.

* cited by examiner

PATH MESSAGE 50

FORWARDING TABLE 60

| DESTINATION | NEXT LINK | NUMBER OF HOPS | ROUTE INFORMATION |
|---|---|---|---|
| NETWORK ADDRESS A | 192.168.1.1 | 2 | R1→R2 |
| NETWORK ADDRESS A | 192.168.2.1 | 3 | R3→R4→R2 |
| NETWORK ADDRESS B | 192.168.1.1 | 2 | R1→R5 |
| ⋮ | ⋮ | ⋮ | ⋮ |

FIG. 6

LER PATH CONTROL TABLE 70

| PATH ID 71 | PATH ATTRIB-UTE 72 | INPUT SIDE LINK 73 | INPUT LABEL 74 | DESTINATION ADDRESS 75 | OUTPUT SIDE LINK 76 | OUTPUT LABEL 77 |
|---|---|---|---|---|---|---|
| ROUTER ID, 1 | STARTING POINT | 192.168.20.1 | — | NETWORK B | 192.168.1.10 | 1 |
| ROUTER ID, 2 | ENDING POINT | 192.168.1.10 | 1 | — | 192.168.20.1 | — |
| ... | ... | ... | ... | ... | ... | ... |

FIG. 8

LABEL CONTROL TABLE 90

| INPUT SIDE LINK (91) | MINIMUM VALUE OF LABEL (92) | MAXIMUM VALUE OF LABEL (93) | USED CONDITIONS OF LABEL (94) | | | |
|---|---|---|---|---|---|---|
| 192.168.1.1 | 1 | 8 | 1 IN USE | 2 NOT USED | ... | 8 NOT USED |
| 192.168.2.1 | 1 | 8 | 1 IN USE | 2 IN USE | ... | 8 NOT USED |
| ⋮ | ⋮ | ⋮ | ⋮ | ⋮ | ⋮ | ⋮ |

FIG. 9

LSR PATH CONTROL TABLE 70

| PATH ID (101) | INPUT SIDE LINK (102) | INPUT LABEL (103) | OUTPUT SIDE LINK (104) | OUTPUT LABEL (105) |
|---|---|---|---|---|
| ROUTER ID, 1 | 192.168.5.1 | 1 | 192.168.4.1 | 1 |
| ROUTER ID, 2 | 192.168.5.1 | 2 | 192.168.3.1 | 1 |
| ⋮ | ⋮ | ⋮ | ⋮ | ⋮ |

FIG. 10

| RESV (111) | PATH ID (112) | SECURED LABEL (113) | RECORD ROUTE OBJECT (114) |
|---|---|---|---|

FIG. 17

LER PATH CONTROL TABLE 180

| PATH ID 181 | PATH ATTRIBUTE 182 | INPUT SIDE LINK 183 | INPUT LABEL 184 | DESTINATION ADDRESS 185 | OUTPUT SIDE LINK 186 | OUTPUT LABEL 187 |
|---|---|---|---|---|---|---|
| ROUTER ID, 1 | STARTING POINT (PRIMARY) | 192.168.20.1 | — | NETWORK B | 192.168.1.10 | 1 |
| ROUTER ID, 1 | STARTING POINT (SECONDARY) | 192.168.20.1 | — | NETWORK B | 192.168.1.10 | 3 |
| ... | ... | ... | ... | ... | ... | ... |

FIG. 21

LINK CONTROL TABLE

| LINK ID | DESTINA-TION LSR | IF PACKAGE NUMBER | CABLE NUMBER | FIBRE NUMBER |
|---------|------------------|-------------------|--------------|--------------|
| 1 | LSR2 | 1 | 1 | 1 |
| 4 | LSR3 | 3 | 3 | 4 |

(221 / 222 / 223 / 224 / 225)

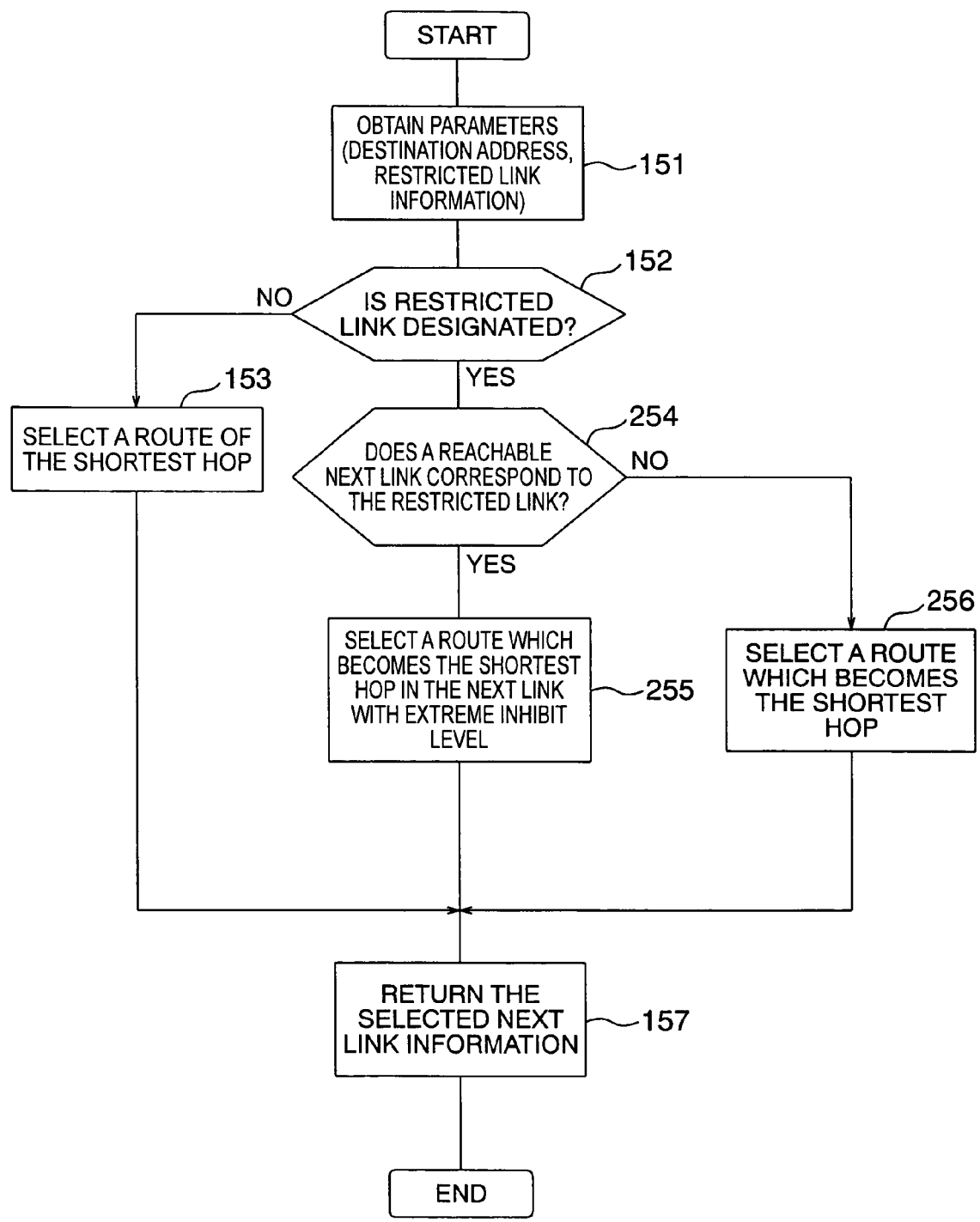

ROUTE CONTROL METHOD OF LABEL SWITCH PATH

INCORPORATION BY REFERENCE

The present application claims priority from Japanese application JP-2004-305077 filed on Oct. 20, 2004, the content of which is hereby incorporated by reference into this application.

BACKGROUND OF THE INVENTION

The present invention relates to route control of a label switch path of MPLS and GMPLS networks.

Standardization of MPLS (Multi Protocol Label Switching) and GMPLS (Generalized MPLS) is being discussed by the IETF (Internet Engineering Task Force). As signaling protocol which setups a path, there are RSVP-TE (Resource reSerVation Protocol-Traffic Engineering) and CRLDP (Constraint-based Label Distribution Protocol), and they have a structure for explicitly designating the path.

The RSVP-TE uses an object which is called ERO (Explicit Route Object). The ERO is sequentially provided with information about nodes through which it is necessary to pass, and the explicit route is determined according to the sequence. For example, an originating node which starts to generate a path sets the ERO within a label allocation request message and sends it to the next node. The node which has received the label allocation request message further decides the next node according to the ERO. And a path is generated along a route specified by the originating node.

The ERO includes firm designation (also called as the strict designation) which specifies routers which are passed through, vague designation (also called as the loose designation) which does not specify a router to be passed through in a specified section, and also includes their combination. Use of the ERO can control the route of the path (e.g., D. Awduche and five others, "RSVP-TE: Extensions to RSVP for LSP Tunnels", (pp 23-31), [online], November 2001, RFC 3209, [searched on Mar. 19, 2004], Internet, see <http://www.ietf.org/rfc/rfc3209.txt?number=3209>).

There is technology using the ERO that a network entrance node uses information of the first generated path, to compute the second path to avoid overlapping with the first route. And, when the second path is generated, the network entrance node uses the computed route information to generate the second path in such a manner that it does not overlap with the first path. Thus, there is proposed a recovery method of a protection type using the two generated paths (e.g., JP-A-2002-247084).

As to the failure recovery of the path, there is proposed an object which is called PPRO (Primary Path Route Object) (e.g., J. P. Lang and two others, "RSVP-TE Extensions in support of End-to-End GMPLS-based Recovery (draft-ietf-ccamp-gmpls-recovery-e2e-signalings-03.txt)", (P 24), [online], February 2004, internet draft, [searched on Mar. 19, 2004], the Internet, see <http://www.ietf.org/internet-drafts/draft-lang-ccamp-gmpls-recovery-e2e-signaling-03.txt>). It describes that route information of the primary path is set on this object and notified to the secondary path.

SUMMARY OF THE INVENTION

A communication node such as a router in a network exchanges routing information to synchronize in a prescribed range (referred to as a routing area). Therefore, if the route becomes long to communicate with a distant node, this route passes through plural routing areas. When a link-state type protocol such as an OSPF or an IS-IS is used and a certain route passes through plural routing areas, each node can grasp only a state of the network in a routing area where it belongs. Therefore, for example, where a path, which extends over plural routing areas, is generated, a path originating node can not explicitly designate a path which is outside of the areas.

Therefore, the technology described in "RSVP-TE: Extensions to RSVP for LSP Tunnels" has a problem that, when plural paths are generated, there is a possibility of passing through the same route in another routing area, and reliability and communication quality cannot be secured.

And, the GMPLS has the same problem even in the same routing area. The GMPLS controls a path on various transports (fiber, WDM wavelength, TDM such as SDH, MPLS, etc.) by a single framework. Therefore, the OSPF and the IS-IS must be able to grasp not only topology of the transports but also network conditions such as a vacant band of a link and to compute the routes of various paths. At present, however, the GMPLS cannot control the network conditions of the above-described various transports within the same routing area.

And, JP-A-2002-247084 and the like do not describe a specific realizing method.

The present invention provides a technology to generate plural paths capable of securing reliability and communication quality.

The present invention also provides a technology which enables to generate a path to realize various types of traffic engineering by a simple method without applying a load due to route computation.

Specifically, the present invention generates plural paths by using restricted link information to designate nodes which are not passed through such that the same route is not passed through within either the same routing area or another routing area.

In other words, the present invention generates a label switch path intended for the MPLS and GMPLS networks wherein a path originating node attaches restricted link information to a label allocation request message and sends it, and a node having received the label allocation request message selects another route which does not pass through the route (called as the restricted link) indicated by the restricted link information, thereby generating the path.

The present invention uses route information of the previously generated path as the restricted link information.

As described above, in generation of any path which is in the single routing area or extends over the plural routing areas, a protection path or a path which realizes traffic engineering can be generated easily, and reliability and communication quality can be secured with ease.

Other objects, features and advantages of the invention will become apparent from the following description of the embodiments of the invention taken in conjunction with the accompanying drawings.

BRIEF DESCRIPTION OF THE DRAWINGS

FIG. 6 is an LER path control table according Embodiment 1;

FIG. 8 is a label control table according to Embodiment 1;

FIG. 9 is an LSR path control table according to Embodiment 1;

FIG. 10 is a format of an RESV message according to Embodiment 1;

FIG. 17 is an LER path control table according to Embodiment 2 of the present invention;

FIG. 21 is a link control table according to Embodiment 5;

FIG. 25 is a processing flow of a route control section according to Embodiment 7 of the present invention.

DETAILED DESCRIPTION OF THE EMBODIMENTS

Embodiments according to the present invention will be described with reference to the attached drawings.

Embodiment 1

Figure 1:
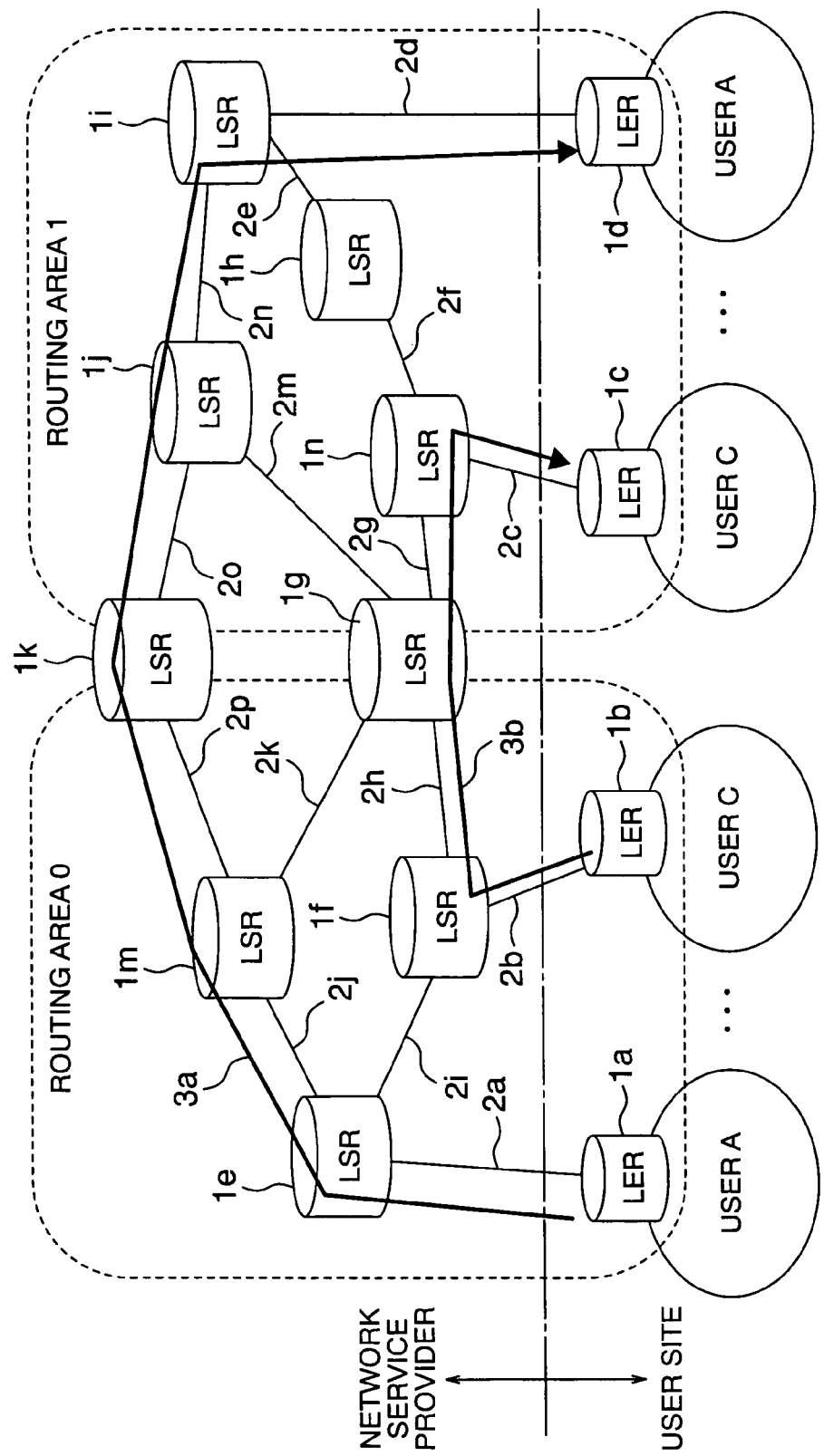
FIG. 1 is a system configuration according to Embodiment 1 of the present invention.

FIG. 1 shows a configuration of an MPLS (Multi Protocol Label Switching) network to which this embodiment is applied. This is a network which provides a label switch path (hereinafter referred to as "path") and is divided into routing areas which are controlled by a network service provider and user sites. A user is, for example, a corporate or the like desiring to configure a VPN (Virtual Private Network) or a person in charge of control of its network, and the path is generated or deleted according to a request from the user.

The routing area is configured of routers (LSR: Label Switch Routers) 1a to in having an MPLS function, and the LSRs 1a to 1d configuring an edge portion of an MPLS network in the user site is particularly called as the LER (Label Edge Router). IP links 2a to 2p connect between the LSRs and between the LSRs 1e to in and the LERs 1a to 1d, and route information is managed by a routing protocol such as the OSPF, the IS-IS or the like. In the specification, the route connecting nodes is called as the link. Specifically, the route is formed of one or more links which are continued.

Two areas are managed by the routing protocol, and the path extending over areas is generated through the LSRs 1g, 1k on the borders of the areas.

Figure 2:
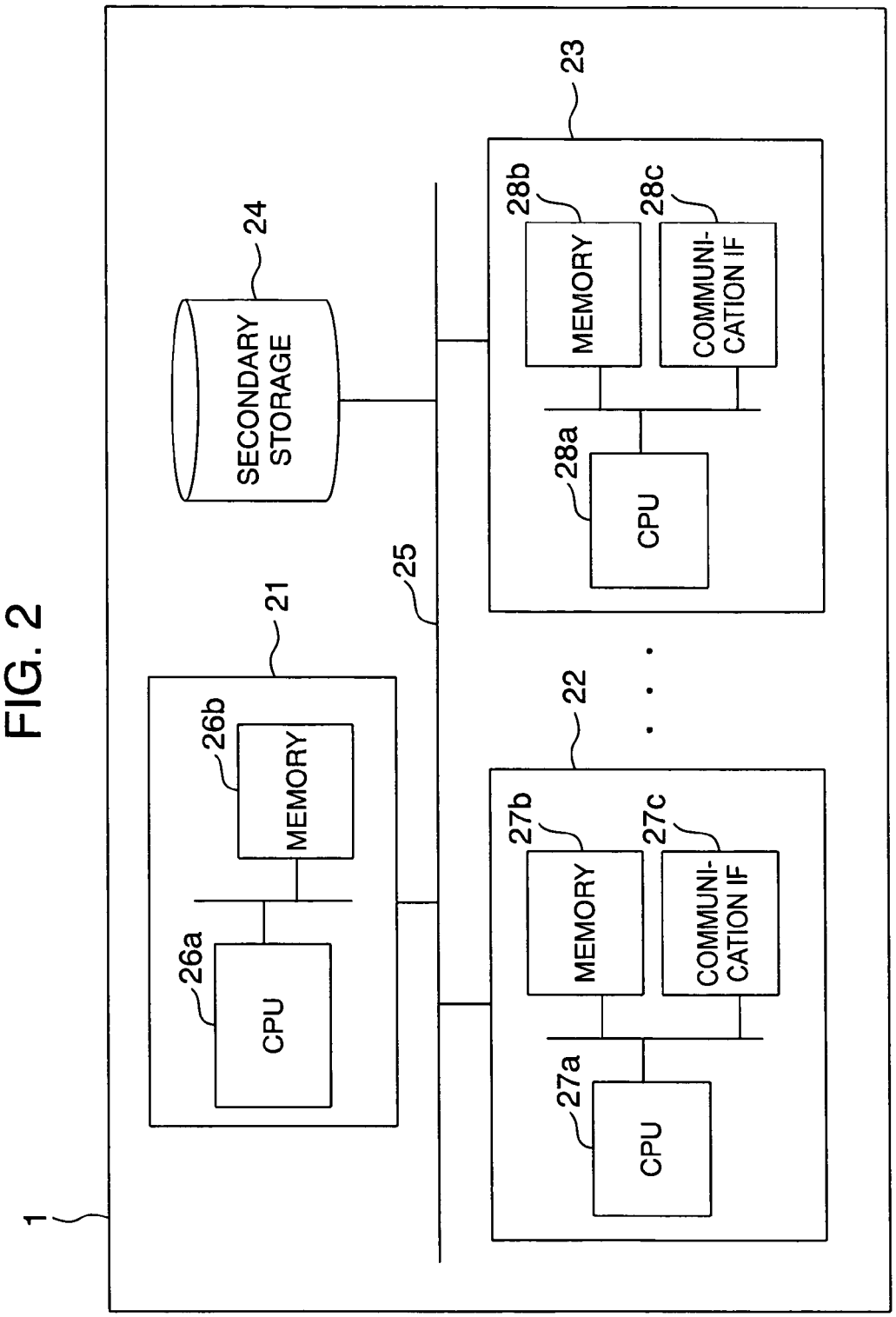
FIG. 2 is a hardware configuration of an LSR and an LER according to Embodiment 1.

FIG. 2 is an example of a hardware configuration of the LSRs 1e to in and the LERs 1a to 1d. The LSRs 1e to in and the LERs 1a to 1d are configured of a path control section 21, which controls the entire apparatus and packet transfer, and transfer processing sections 22, 23, which are present for each communication interface and transfer a label packet, and they are mutually connected by a communication line such as a bus 25.

The path control section 21 has a CPU 26a and a memory 26b, and the transfer processing sections have a CPU 27a, a memory 27b and a communication interface 27c. They perform processing when each CPU loads a program stored in a secondary storage 24 into the each memory and executing the program.

The individual programs may be previously stored in the memories in the above-described individual apparatuses and introduced if necessary through a detachable storage medium or communication medium (communication line or a digital signal or a carrier wave on the communication line) which can be used by the individual apparatuses.

A detail structure of the path control section 21 of the LSR and the LER realized by executing the program will be described with reference to FIG. 3. The path control section 21 is configured of an IP packet processing section (hereinafter referred to as the IP) 38 which processes to send and receive an IP packet (routing, signaling message), a signaling protocol processing section (hereinafter referred to as the signaling protocol) 32, a command input section 31, a route control section 33, a label control section 34, an LSP control section 35, a routing protocol processing section (hereinafter referred to as the routing protocol) 37, and a topology DB 36.

In this embodiment, a RSVP-TE (Resource reSerVation Protocol-Traffic Engineering) is used as a protocol processed by the signaling protocol 32, and another protocol, e.g., a CR-LDP (Constraint Routing-Label Distribution Protocol) can also be used.

A path generation process by the path control section 21 will be described. First, a process of the LERs 1a to 1d which make starting points of the path will be described with reference to FIG. 3. The user uses a control terminal which is connected via an exclusive interface or a network and designates an input link, a destination address and restricted link information (option) reflected to the route decision of a path to request the LERs 1a to 1d to generate the path.

First, the generation of a path not designating a restricted link will be described. A path generation request is accepted by the command input section 31 of the LERs 1a to 1d and notified to the signaling protocol 32 (FIG. 3 (1)).

Figure 3:
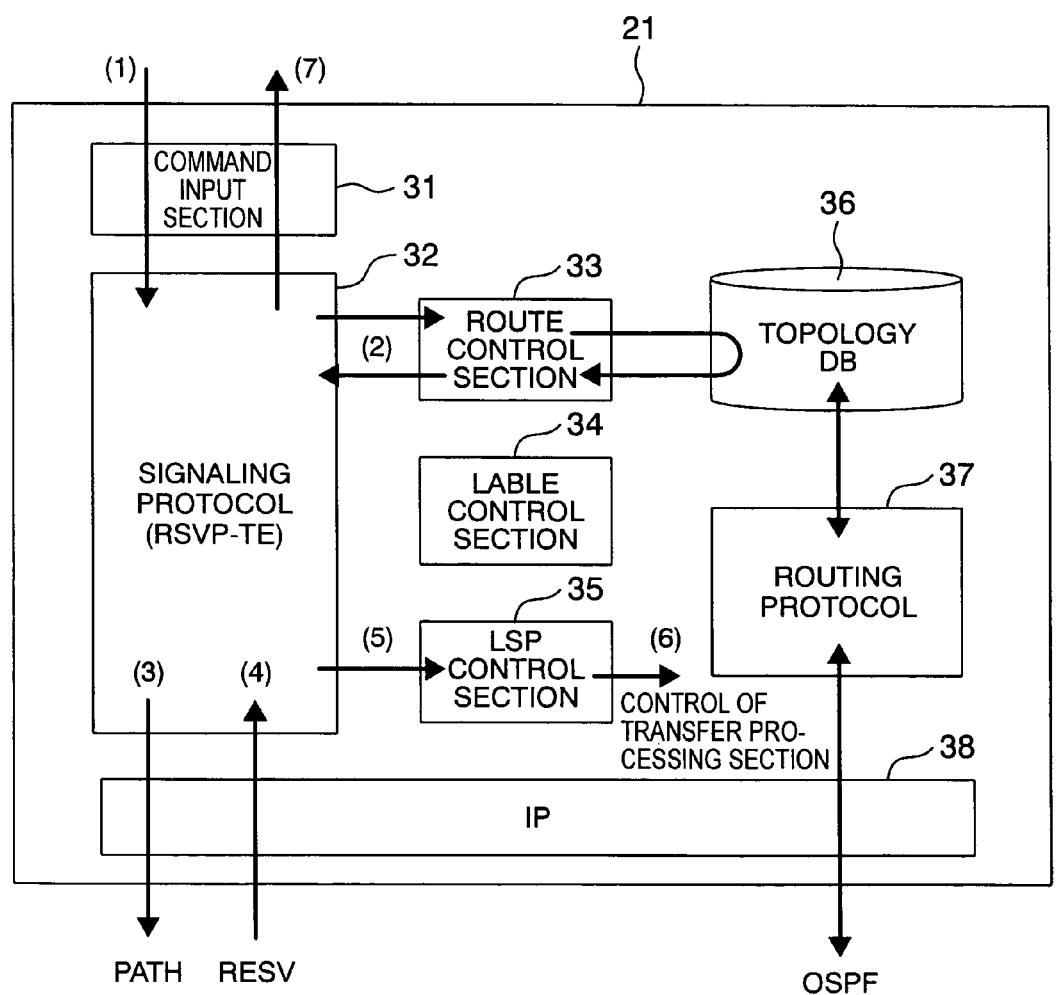
FIG. 3 is a processing flow of a path originating LER according to Embodiment 1.

The signaling protocol 32 generates a path ID for identification of a path, notifies a destination address to the route control section 33, shows adjacent LSRs and obtains the next link information of the path (FIG. 3 (2)).

If restricted link is designated, restricted link information is also notified to the route control section 33.

Then, the signaling protocol 32 sends a label allocation request message (hereinafter referred to as the PATH message) onto a next link (namely, to a next LSR) selected by the route control section 33 via the IP 38 (FIG. 3 (3)) and waits for reception of a response label allocation notification message (hereinafter referred to as the RESV message).

Figures 4, 5:
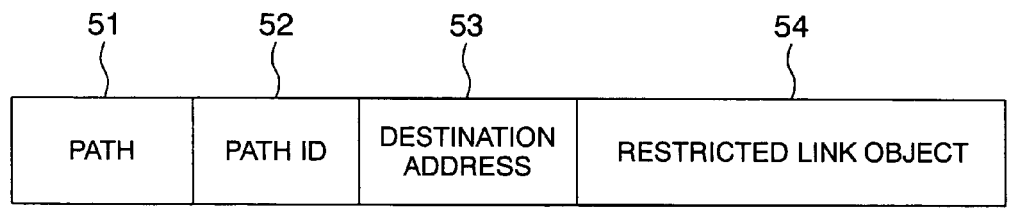
FIG. 4 is a format of a PATH message according to Embodiment 1.
FIG. 5 is a forwarding table according to Embodiment 1.

FIG. 4 shows a format of a PATH message 50. It is comprised of a field 51 indicating a label allocation request (PATH), a field 52 for setting a path ID, a field 53 for setting a destination address, and a field 54 for setting a restricted link object. The restricted link object 54 is data designating the restricted link and will be described in detail later.

FIG. 5 shows a structure of a forwarding table 60 which is formed in the topology DB 36 by the routing protocol 37. It is comprised of areas 61 to 64 for setting destination addresses, information of the next link reachable to the destination address, the number of hops to the destination, and information of routes to the destination.

The routing protocol 37 sets the link information advertised by another LSR in the same routing area, the number of hops to the destination and route information into the areas 63, 64 in the forwarding table 60. If there are plural routes capable of reaching a single destination address, plural entries are generated. And, if the destination address is outside of the routing area, the number of hops to the destination address cannot be counted. Therefore, the number of hops to the LSR 1k or the LSR 1g on the boundaries of the routing areas is set.

If no restricted link information is notified by the signaling protocol 32, the route control section 33 refers to the forwarding table 60 and selects the next link which configures a route through which the number of hops becomes minimum.

Upon receiving the RESV message (FIG. 3 (4)), the signaling protocol 32 notifies to the LSP control section 35 the path ID possessed by the message, the path attribute (starting point), the input link and destination address designated at the time of path generation request, the next link (output side link) and the label information (output label) set in the RESV message (FIG. 3 (5)).

The LSP control section 35 sets the notified information in an LER path control table 70 of FIG. 6 and controls the transfer processing sections 22,23 (FIG. 3 (6)). Specifically, the output label is set and transfer processing to the output link (output side link) is performed for the IP packet of the destination address from the designation input link (input side link).

The LER path control table 70 controls information of the starting point or terminating of the path and is comprised of areas 71 to 77 for setting the path ID, path attribute, input route, input label, destination address, output route and output label. The path attribute (area 72) is a code to identify whether the path is a starting point or an ending point. When the path is a starting point, the input label (area 74) is not present and it is not necessary to set, and when the path is an ending point, the destination address and the output label (areas 75, 77) are not present and it is not necessary to set.

Lastly, the signaling protocol 32 sends the path ID and the generated path route information to the user's control terminal via the command input section 31 and terminates the processing (FIG. 3 (7)). Thus, the path originating LERs 1a to 1b perform processing.

Then, processing by the LSRs 1e to in which become midpoints of the path will be described with reference to FIG. 7. Upon receiving a PATH message (FIG. 7 (1)), the signaling protocol 32 obtains the next link information of the path from the destination address in the same manner as the path originating LERs 1a and 1b, sends the PATH message, and falls in a state of waiting for a RESV message (FIG. 7 (2), (3)).

Figure 7:
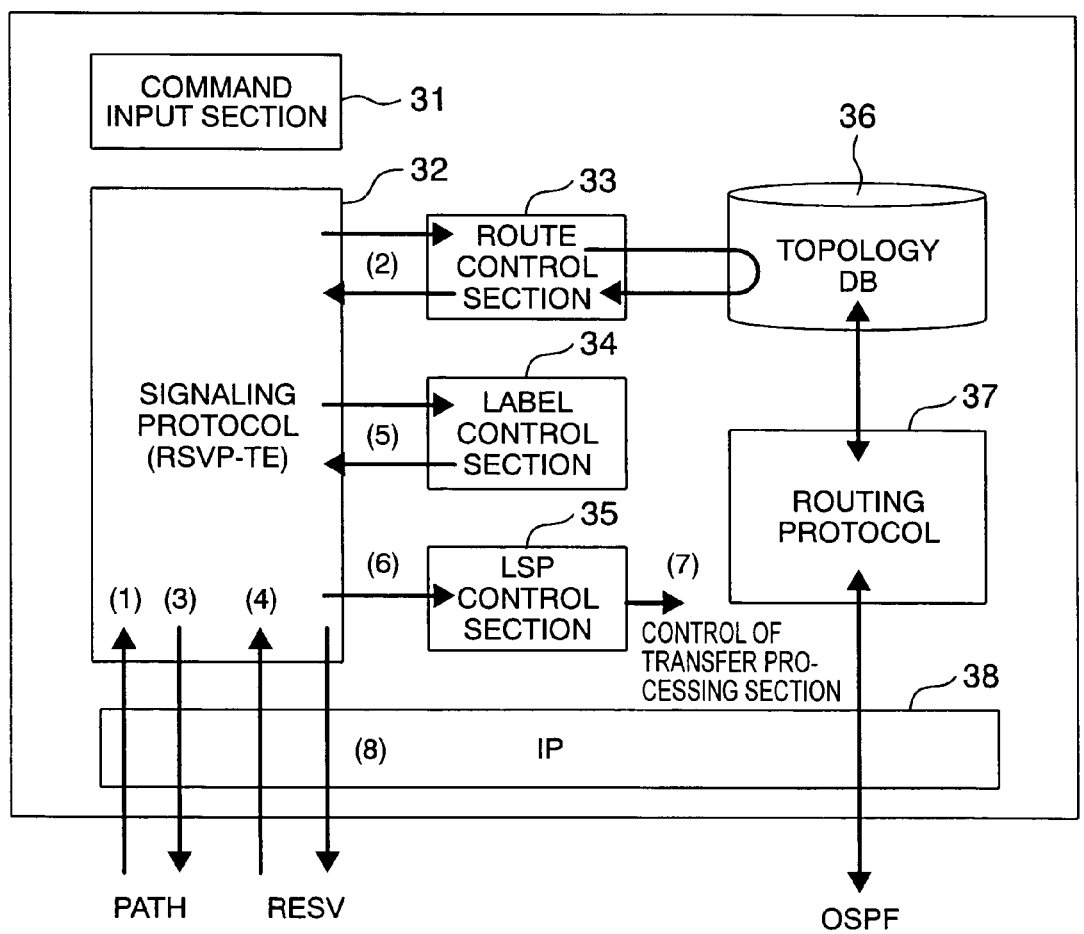
FIG. 7 is a processing flow of a path intermediate LSR according to Embodiment 1.

After the RESV message is received (FIG. 7 (4)), a PATH message receiving link (input side link) is notified to the label control section 34, and an empty label is secured (FIG. 7 (5)).

The label control section 34 uses a label control table 90 shown in FIG. 8 to control the used conditions of labels. The label control table 90 is comprised of areas 91 to 94 for setting the minimum and maximum values of a label and the used conditions of the label for each input link and controls whether the individual labels are in use or in a vacant state.

The label control section 34 uses the label control table 90 to secure the empty label and notifies to the signaling protocol 32.

After securing the label, the signaling protocol 32 notifies to the LSP control section 35 a path ID, a PATH message receiving link (input side link), a secured label (input label), a next link (output side link) and label information (output label) set in the received RESV message (FIG. 7 (6)).

The LSP control section 35 sets the notified information in the LSR path control table 70 and controls the transfer processing sections 22, 23 (FIG. 7 (7)). In other words, it is determined such that the packet forwarding is conducted according to the set label.

FIG. 9 shows a structure of the LSR path control table 70. This table is used to control information of relay points of the path, and each entry is comprised of areas 101 to 105 for setting a path ID, an input route, an input label, an output route, an output label.

FIG. 10 shows a format of a RESV message. It is comprised of a field 111 indicating label allocation notification (RESV), a field 112 in which a path ID is set, a field 113 in which an allocated label (secured label) is set, and a field 114 in which a record route object (RRO) is set. The RRO is an object which is defined by the RSVP-TE in order to record the route of the path. The output side link of the path is added to the RRO to record the output side link sequentially from the terminating LRE of the path. Thus, the path originating LERs 1a to 1b obtains information of all routes of the path.

The signaling protocol 32 generates a RESV message and sends the RESV message onto the PATH message receiving link (FIG. 7 (8)). Thus, the LSRs 1e to 1n which become the midpoints of the path are processed.

Lastly, processing of the LERs 1c to 1d which become the end of the path will be described with reference to FIG. 11.

Figure 11:
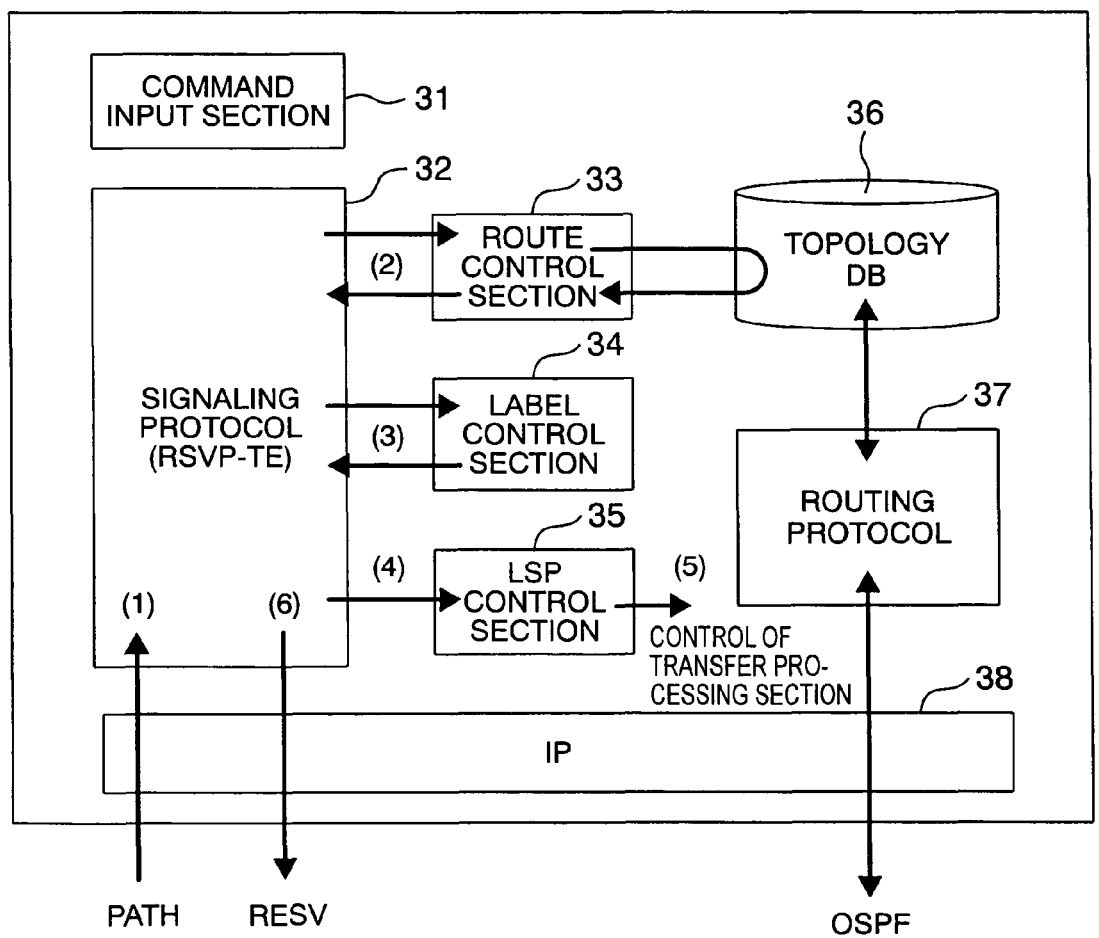
FIG. 11 is a processing flow of a path terminating LER according to Embodiment 1.

After the PATH message is received (FIG. 11 (1)), the next link information is obtained from the destination address in the same manner as the intermediate LSRs 1e to in (FIG. 11 (2)). But, the next link is not present, and the PATH message is not sent because the LERs 1c and 1d are the ends.

Then, the label of the PATH message receiving link is secured by processing in the same manner as that for securing the label of the intermediate LSR (FIG. 11 (3)).

After the label is secured, the signaling protocol 32 notifies to the LSP control section 35 the path ID, path attribute (end), PATH message receiving link (input side link), secured label (input label) and output link (destination address) (FIG. 11 (4)).

Upon processing to set in the LER path control table 70, the LSP control section 35 controls the transfer processing sections 22, 23 (FIG. 11 (5)). Specifically, a process to send the label packet, which is from the designated input link, to the output link is performed. The label is removed because it is the end of the path.

The signaling protocol 32 generates a RESV message and sends it onto the PATH message receiving link (FIG. 11 (6)).

Thus, the operation to generate the path when there is no limitation of the path was described as above. By processing as described above, the path to the designated designation is generated with the shortest route, and the user can grasp the path ID and the route information of the path.

Figure 12:
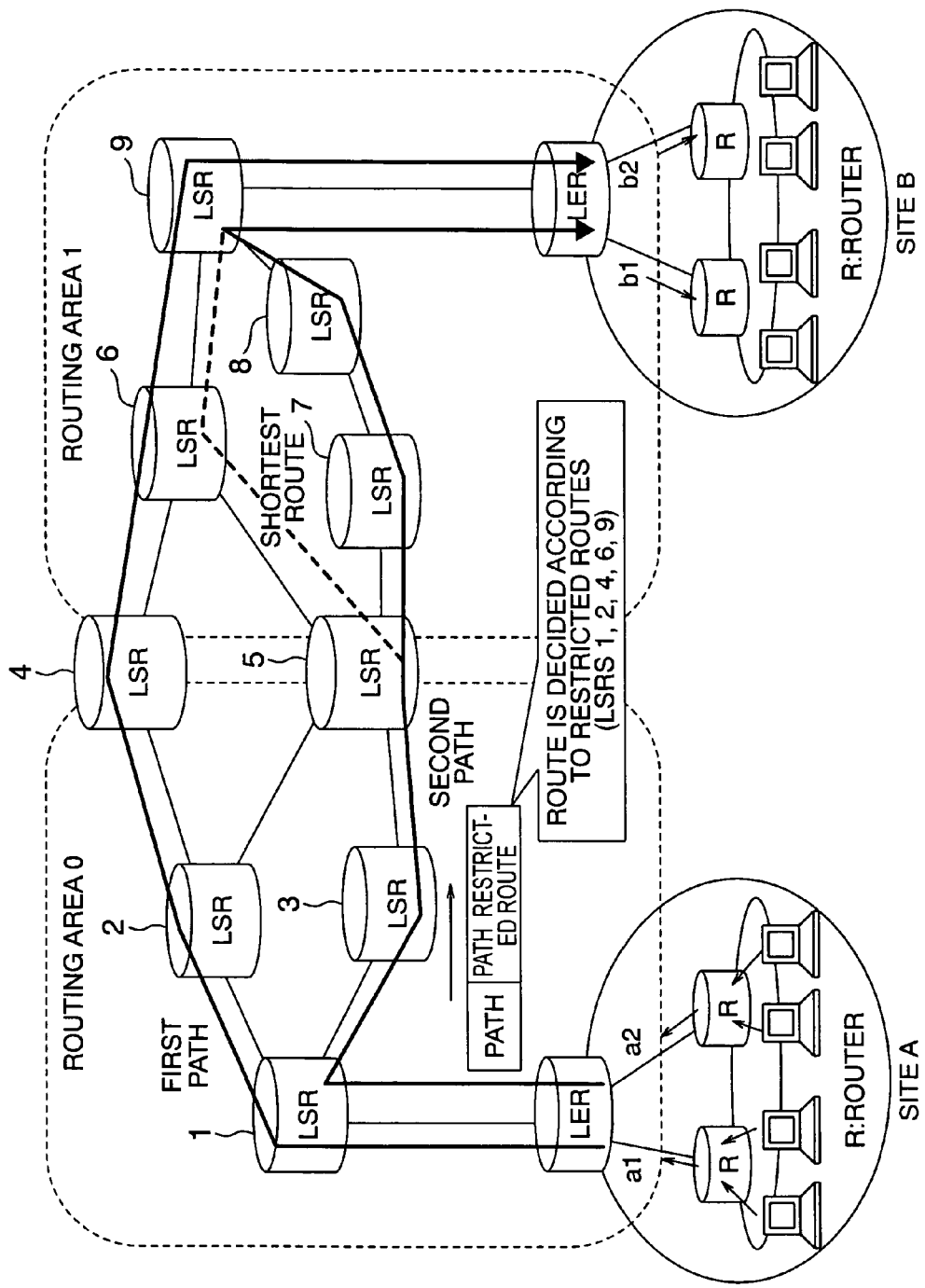
FIG. 12 is a path setting example according to Embodiment 1.

Then, the generation of a path with the restricted link designated will be described. As shown in FIG. 12, the generation of plural paths between sites A and B by the user as measures at a time of load distribution or failure will be described.

A first path is generated by a method which does not designate the above described restricted link. The user uses a control terminal to designate an input route (a1) and the address of a b1 network of the site B at the LER of the site A which becomes' the starting point of the path to request the generation of a path. The path is computed at originating LERs and intermediate LSRs of the path. Here, it is assumed that the path is generated through the shortest path of LSR 1, LSR 2, LSR 4, LSR 6 and LSR 9.

A second path is desirably formed to take a route quite different from the first path so that risk can be distributed in case of a trouble. Therefore, the user uses the control terminal to designate the restricted link by using the input route (a2), the address of the b2 network of the site B, and the route information notified at the first path generation at the LER of the site A which becomes the starting point of the path.

Figure 13:
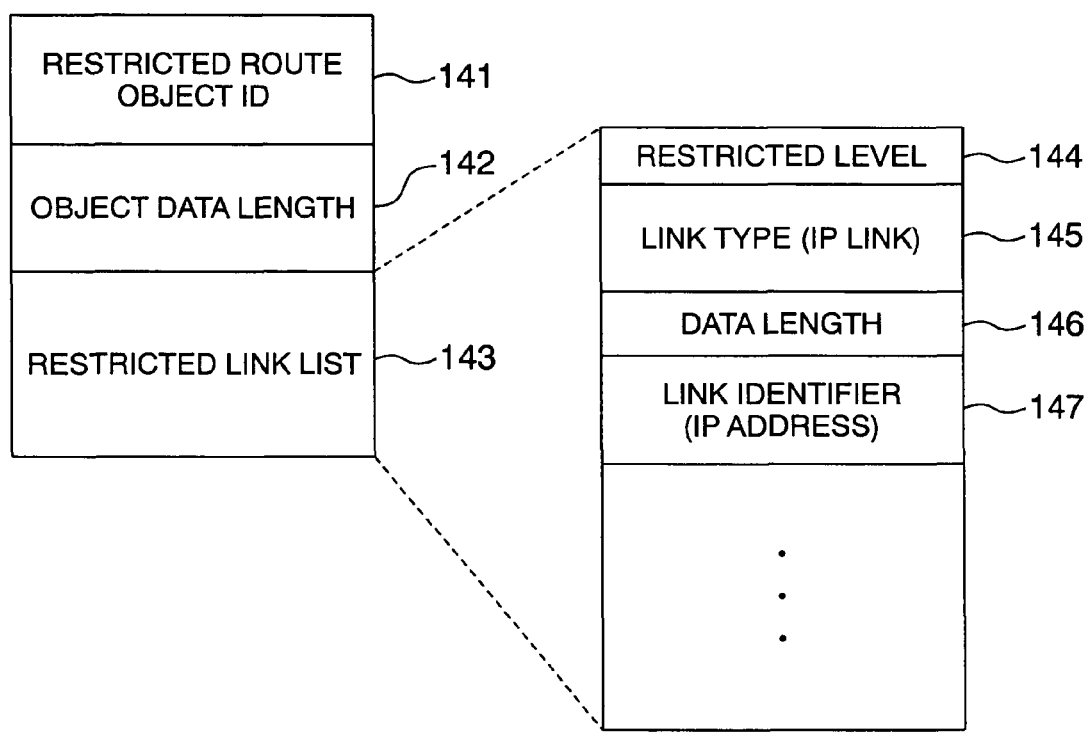
FIG. 13 is a format of a restricted route object according to Embodiment 1.

FIG. 13 shows a format of a restricted link object which is newly defined. It is comprised of an area 141 where ID for identifying the restricted link object is set, an area 142 where object data length is set, an area 143 where restricted link list is set. The restricted link list (area 143) is comprised of at leas one piece of restricted link information including areas 144 to 147 where a restricted level, a link type, a data length and a link identifier are set.

As the restricted level (area 144), there are provided an absolute inhibit level to securely inhibit the passage of the designation route and a extreme inhibit level which inhibits the passage of the designation route as much as possible. The link type (area 145) indicates a type of link. In this embodiment, all the links are IP links that the IP address becomes a link identifier (area 147). The user uses the control terminal to designate a restricted level of the individual link as the restricted link information and requests the generation of the path.

The path generation request with the restricted link designated has also the same flow of processing of the signaling protocol 32 except that the processing of the route control section 33 is merely changed.

Figure 14:
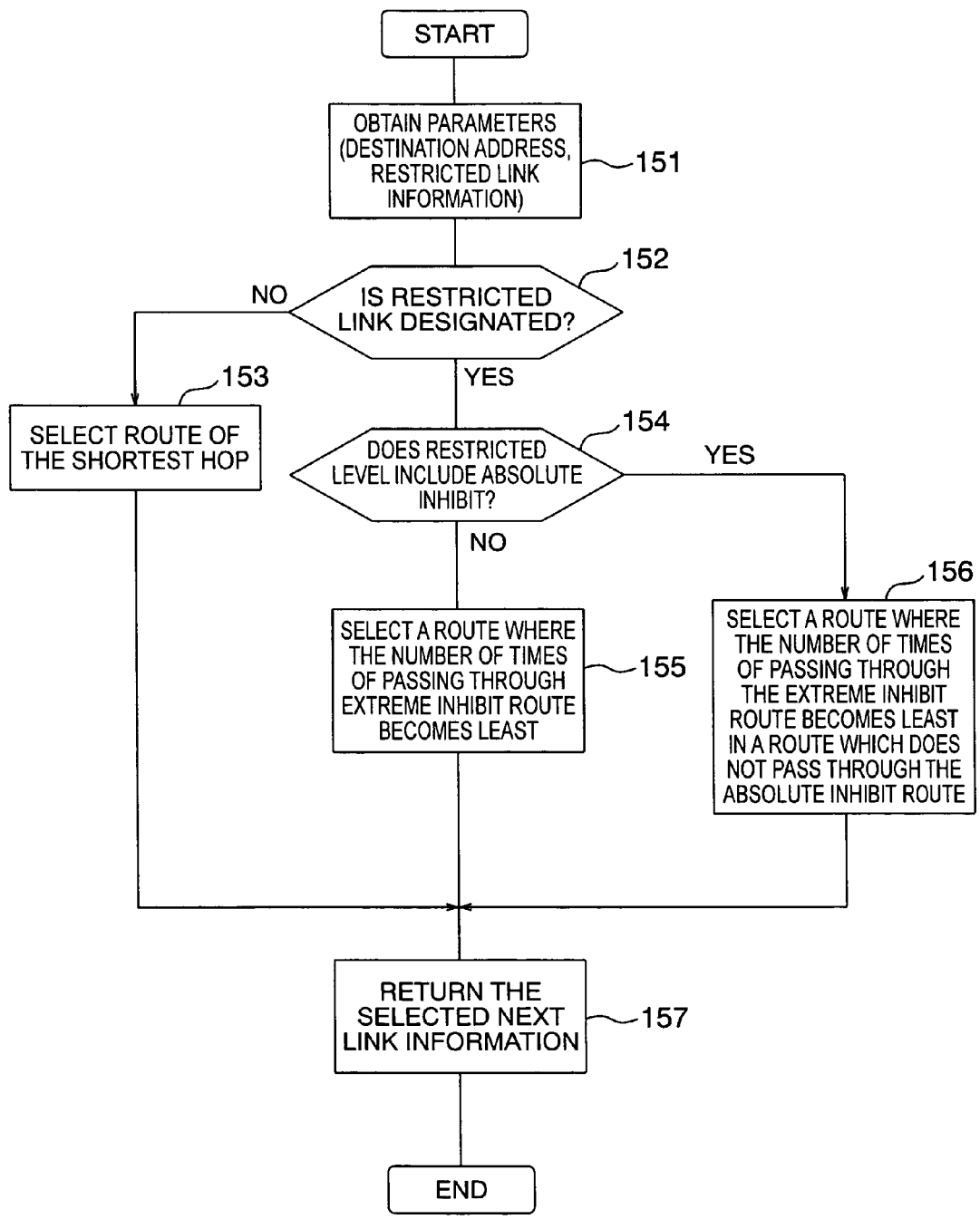
FIG. 14 is a processing flow of a route control section according to Embodiment 1.

FIG. 14 shows a detail processing flow of the route control section 33 of the individual LSRs. First, the destination address and the restricted link information are obtained from the signaling protocol 32 (step 151). The restricted link information is optional and may not be designated.

If the restricted link is not designated, the forwarding table 60 of the topology DB 36 is referred to, a route where the number of hops becomes minimum is selected from the destination address, and its output route is sent to the signaling protocol 32 (steps 152, 153, 157). If the restricted link is designated, the forwarding table is referred to, and a route capable of reaching the destination address is searched. And, information of the route to the destination and information of the restricted link are compared to select the next link of the path.

Where the whole restricted link list shown in FIG. 13 indicates extreme inhibit levels, a route which has the least number of times of passing through the extreme inhibit route is selected, and its output link is sent to the signaling protocol 32 (steps 154, 155, 157). If there are plural routes which do not pass through the extreme inhibit link, the route with a less number of hops is selected with priority. If the restricted link list includes even one absolute inhibit restricted level, a route with the least number of times of passing through the extreme inhibit route is selected among the routes which do not pass through the absolute inhibit route. Thus, the processing of the route control section 33 is carried out as described above.

A link selection policy at the above-described extreme inhibit level is one example, and another policy may be followed. This policy is previously determined as a processing of the route control section 33 but may be made variable as required.

The above-described second path generation will be described with reference to FIG. 12.

Where the whole restricted link list shown in FIG. 13 indicates extreme inhibit of all the routes of the first path, the LSR 1 selects a route to the LSR 3, and the LSR 3 selects a route to the LSR 5. The route passing through the LSR 6 becomes shortest from the LSR 5, but the link between the LSR 6 and the LSR 9 is extreme inhibited, so that the route to the LSR 7 is selected. Similarly, the LSR 7 selects a route to the LSR 8, and the LSR 8 selects a route to the LSR 9. As a result, the second path is generated in order of routes LSR 1, LSR 3, LSR 5, LSR 7, LSR 8 and LSR 9.

Figure 15:
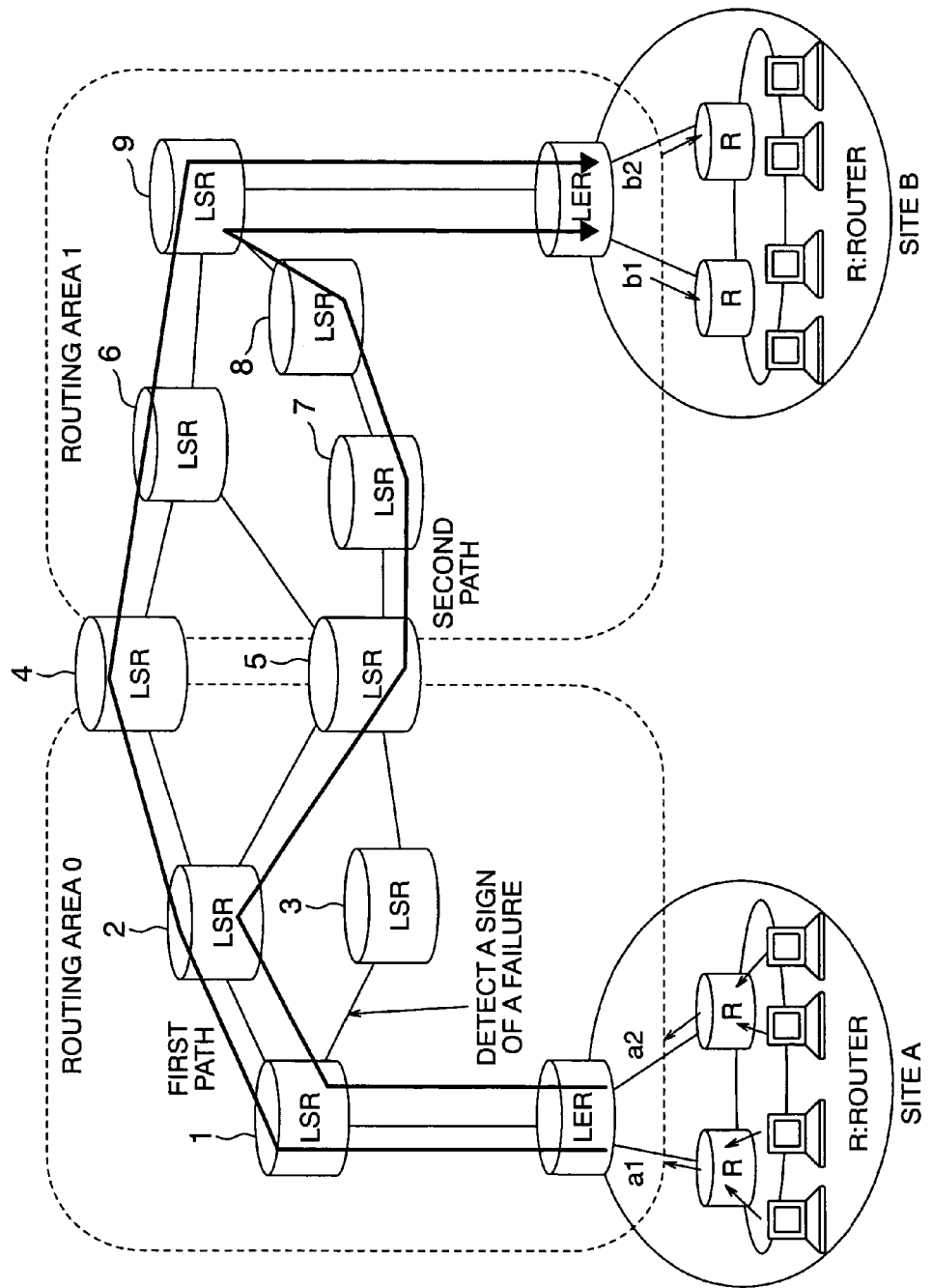
FIG. 15 is an example of path generation by an absolute inhibit level according to Embodiment 1.

As another path generation request, the state of a given link repeats normal and abnormal frequently, and this link might be designated at an absolute inhibit level. For example, it is assumed that a user network administrator detects a sign of a link failure between the LSR 1 and the LSR 3 as shown in FIG. 15. And, it is assumed that the user uses a control terminal to restrict the link among all nodes of the first path at the extreme inhibit level and the link between the LSR 1 and the LSR 3 by absolute inhibit at a time of the second path generation request.

In this case, the route control section 33 of the LSR 1 does not select a route to the LSR 3 which is absolutely inhibited but selects a route to the LSR 2. The LSR 2 selects a route to the LSR 5, the LSR 5 selects a route to the LSR 7, the LSR 7 selects a route to the LSR 8, and the LSR 8 selects a route to the LSR 9. As a result, the second path is generated in order of the routes LSR 1, LSR 2, LSR 5, LSR 7, LSR 8 and LSR 9.

Thus, according to this embodiment, the individual LSRs decide a path according to the restricted link, the control to generate a path extending over the routing areas can be made, and the path generation to realize traffic engineering becomes possible.

Embodiment 2

Figure 16:
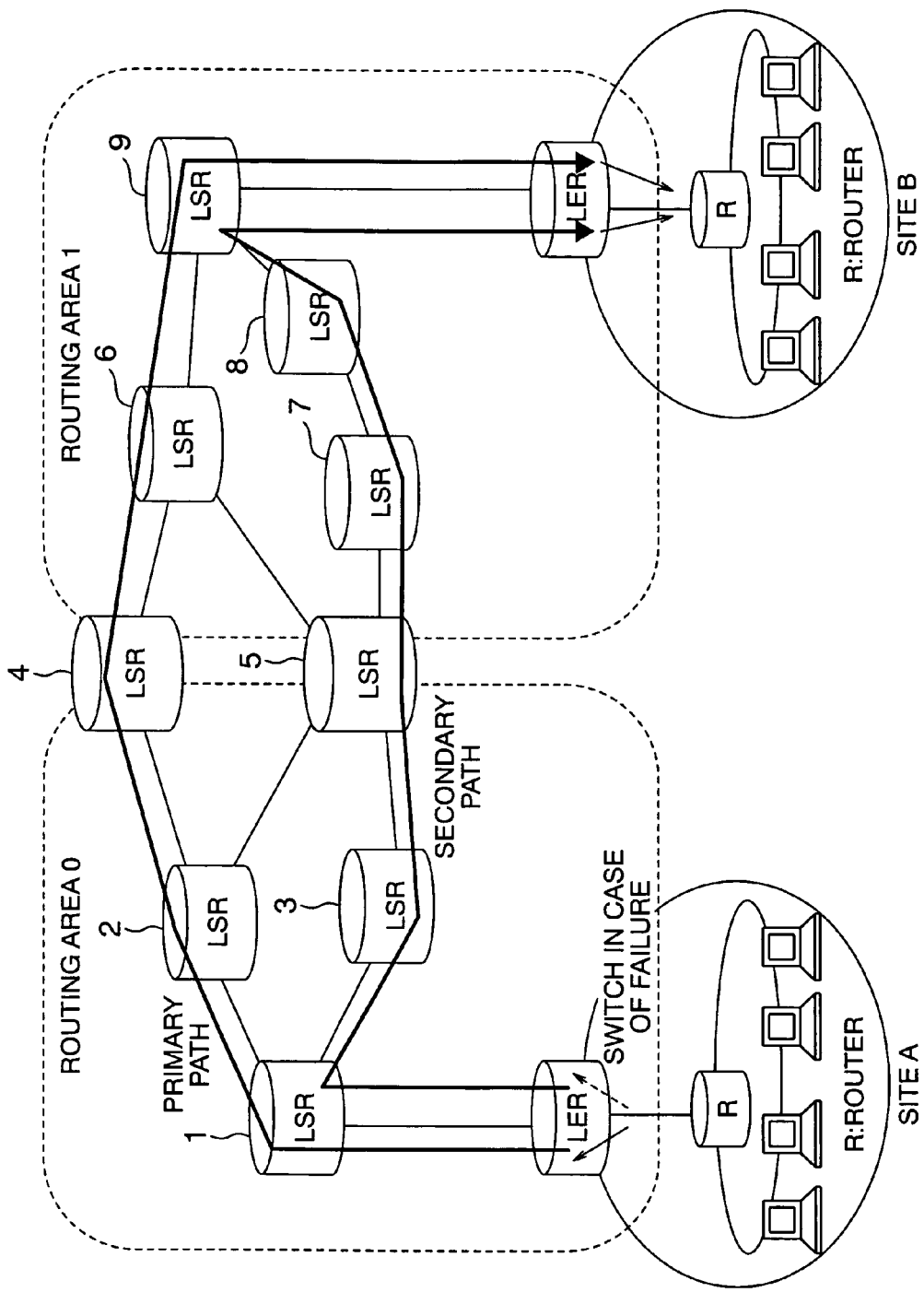
FIG. 16 is an example of generation of a protection path according to Embodiment 1.

An operation to provide the user with a protection type path will be described. The protection type previously generates the secondary path for backup as shown in FIG. 16 and switches to the secondary path if a failure occurs on the primary path. The network resource is consumed for the secondary path, but the failure can be recovered quickly.

The user uses the control terminal to make a path generation request in the same manner as in Embodiment 1. The path control section of the path originating LER generates a path (to be the primary path) by the same procedure as in Embodiment 1 and processes to generate the secondary path with the route information of the primary path used as the restricted link.

Specifically, the signaling protocol of the path originating LER obtains route information of the generated primary path from the RRO, and all the obtained links are determined as extreme inhibit levels to generate restricted link information.

Then, the destination and restricted link information are given to the route control section, the next link is obtained, and a PATH message for the secondary path is generated and sent onto the next link.

The process to generate the primary path and the secondary path at the intermediate LSR and the terminating LER of the path is performed in the same manner as in Embodiment 1. When the primary path has a failure, the path originating LER is switched to the secondary path, so that the process is changed.

The signaling protocol 32 notifies to the LSP control section 35 separately the generation of the primary path or the generation of the secondary path. The path ID is coordinated by using the same ID for the primary path and the secondary path.

The path originating LER shows explicitly in the path attribute information whether the path is primary or secondary as shown in FIG. 17 in addition to the structure of the LER path control table 70 of Embodiment 1 and uses an LER path control table 180 which allows grasping the switch path.

When the generation of the primary path is notified from the signaling protocol 32, the LSP control section 35 of the path originating LER processes to register in the LER path control table 180 and controls the transfer processing sections 22, 23 to transfer the packet by label switching. When the secondary path generation is notified, only a process to register in the LER path control table 180 is performed.

After generating the secondary path, the signaling protocol 32 notifies the ID of the generated protection type path and the route information about the primary path and the secondary path to the user control terminal.

Switching to the secondary path is performed upon receiving the failure notification of the primary path from the signaling protocol 32.

The failure notification can be realized using a RESV error message or a notification message which is defined by the RSVP-TE. Therefore, the details are omitted.

When a failure occurs, the signaling protocol 32 of the path originating LER detects a failure of the primary path according to the RESV error message or the notification message. And, it notifies to the LSP control section 35 the ID of the path suffering from the failure.

The LSP control section 35 refers to the LER path control table 180 to obtain information about the secondary path. And, the transfer processing sections 22, 23 are controlled to switch the path to the secondary path. Thus, the restricted link is designated to generate the path, and a protection type path can be generated easily when it extends over plural routing areas.

Embodiment 3

An operation to use explicit route designation (ERO) defined by the RSVP-TE and restricted link designation in combination will be described using the network structure shown in FIG. 12 with reference to an example of generating plural paths between user sites in the same manner as in Embodiment 1.

The user instructs the generation of the first path and requests the generation of the second path with the generated first path used as a restricted link in the same manner as in Embodiment 1. Then, each LSR decided the route according to the restricted link information in Embodiment 1. But, a route computed by the originating LER is used as a route (called as the explicit route) to be passed through within a routing area 0 in Embodiment 3. And, the route computed by a boundary LSR is used as an explicit route within the routing area 1.

Figure 18:
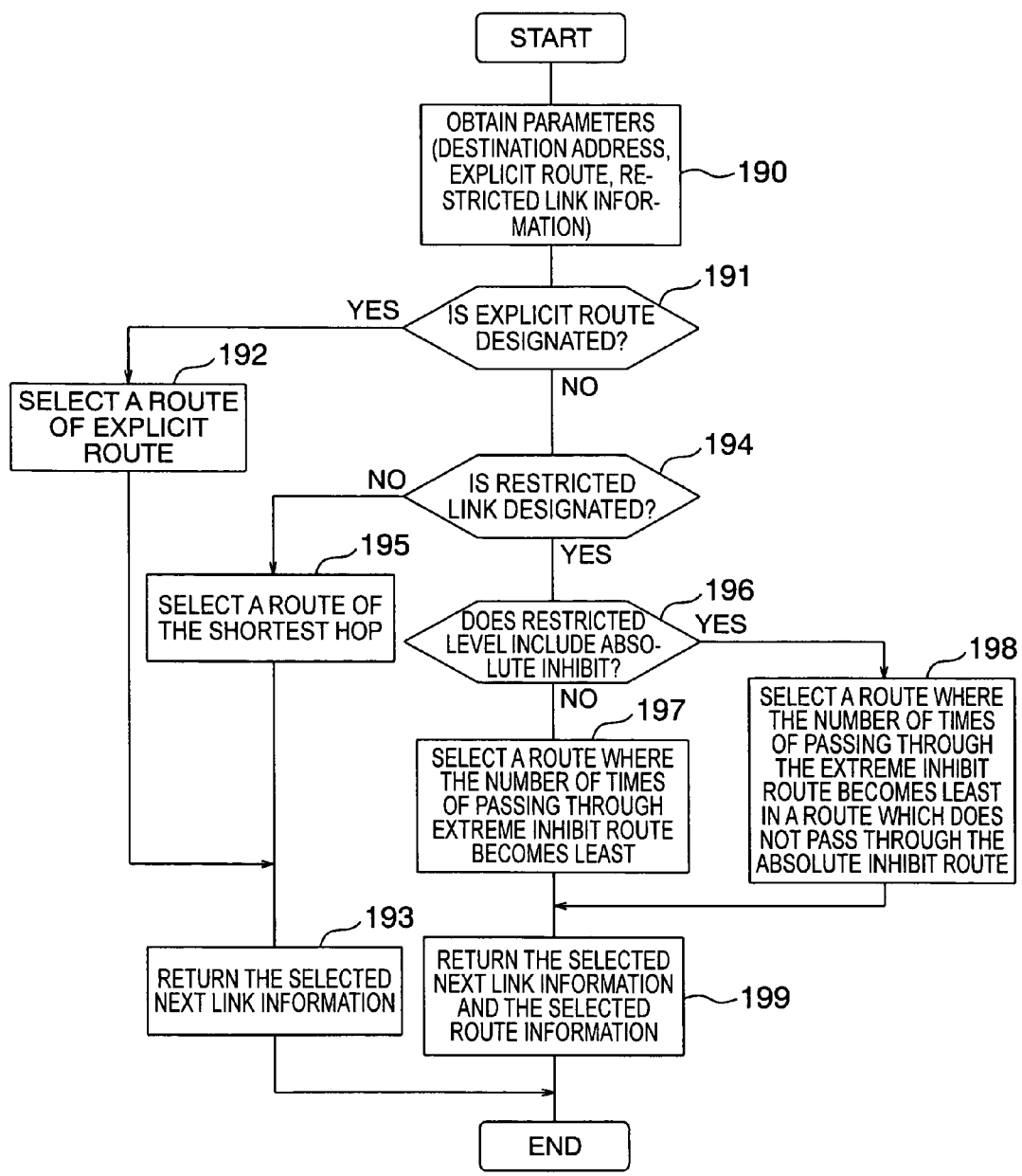
FIG. 18 is a processing flow of a route control section according to Embodiment 3 of the present invention.

The route control section 33 decides a route with reference to explicit route information and restricted link information. FIG. 18 shows a processing flow of the route control section 33. The route control section 33 receives not only the restricted link information but also the explicit route information as an option parameter from the signaling protocol 32 (step 190).

If the explicit route is designated, the explicit route is sent to the signaling protocol 32 according to the explicit route (steps 191, 192, 193). If an explicit route and a restricted link are not designated, a route with the minimum number of hops is selected in the same manner as in the first embodiment, and its output route is sent out (steps 194, 195, 193).

The route selection processing (step 198) when the restricted link is designated is also the same as in the first embodiment, except that the computed route information is also added to the information to be sent out (step 199).

The signaling protocol 32 sets the route information received from the route control section 33 as the explicit route object in a PATH message and sends out. Thus, the LSR which receives the PATH message next can decide a route using the explicit route.

In FIG. 12, at the time of generating the second path, the route control section 33 calculates at the originating LER of the path a route according to the restricted link designated by the user. The route can be specified within the routing area to which the path originating LER belongs. Therefore, its route information is determined as the explicit route object and set in the PATH message.

Here, it is assumed that the route is selected in order of LSR 1, LSR 3 and LSR 5. At the time of deciding the route, the explicit route is selected for the LSR 1 and the LSR 3, and the LSR 5 which is a boundary LSR performs route computation on the basis of the restricted link.

It is assumed that the route control section 33 of the LSR 5 selects a route in order of LSR 7, LSR 8, LSR 9 and LER on the basis of the restricted link information. The LSR 5 sets the route selected according to the restricted link as an explicit route object within the PATH message. Thus, the LSR 7, the LSR 8 and the LSR 9 select an explicit route, and the second path is generated in order of the routes LSR 1, LSR 2, LSR 5, LSR 7, LSR 8 and LSR 9. Thus, it is not necessary to calculate the route at the LSRs on the path designated by the explicit route. Therefore, the burden due to the route computation can be reduced, and the path generation time can also be reduced.

Embodiment 4

In Embodiments 1 to 3, a physical IP link was designated as the restricted link. But, routing protocol such as MPLS or GMPLS can deal with the path as one virtual link, so that it is also possible to designate the path as the restricted link.

Figure 19:
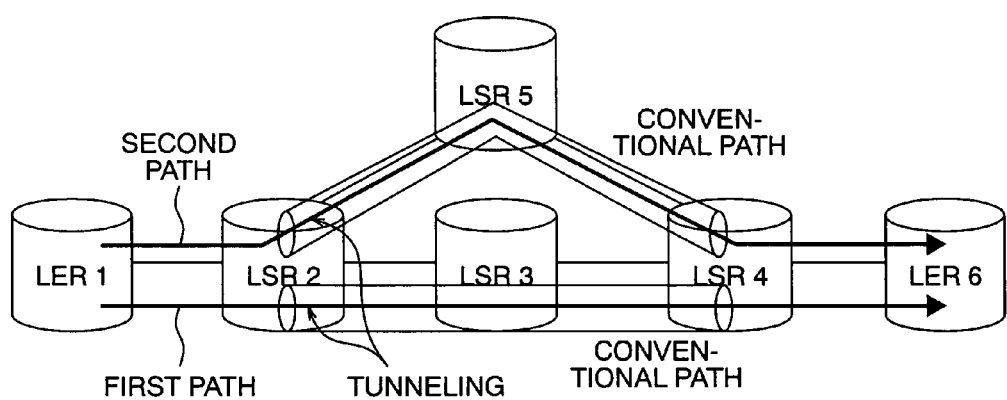
FIG. 19 is an example of generation of a tunneling path according to Embodiment 4 of the present invention.

As shown in FIG. 19, when a path is generated by tunneling, the tunneling route is identified by the path ID, and the path ID is also set on the record route object. As the first path route, it has an order of LER 1, LSR 2, LSR 4 and LER 6, the IP link between the LER 1 and the LSR 2 and between the LSR 4 and the LER 6 is identified by the IP address in the same manner as in Embodiments 1 to 3, and the link between the LSR 2 and the LSR 4 is identified by the path ID.

In this embodiment, the path ID can be designated as the restricted link by defining a path to the link type (field 145) of the restricted link list 143 and setting the path ID to the link identifier (field 147) in the restricted link object of FIG. 13.

The route control section 33 selects a route by handling the path in the same manner as the IP link is handled. In FIG. 19, it is assumed that the first path route is entirely designated at the extreme inhibit level when the user generates the second path. Because there is one link between the LER 1 and the LSR 2 and between the LSR 4 and the LER 6, the same link as that of the first path is selected, but another link (path) is selected between the LSR 2 and the LSR 4. Thus, it becomes possible to control the route of the path even when the path is generated by tunneling.

Embodiment 5

Figure 20:
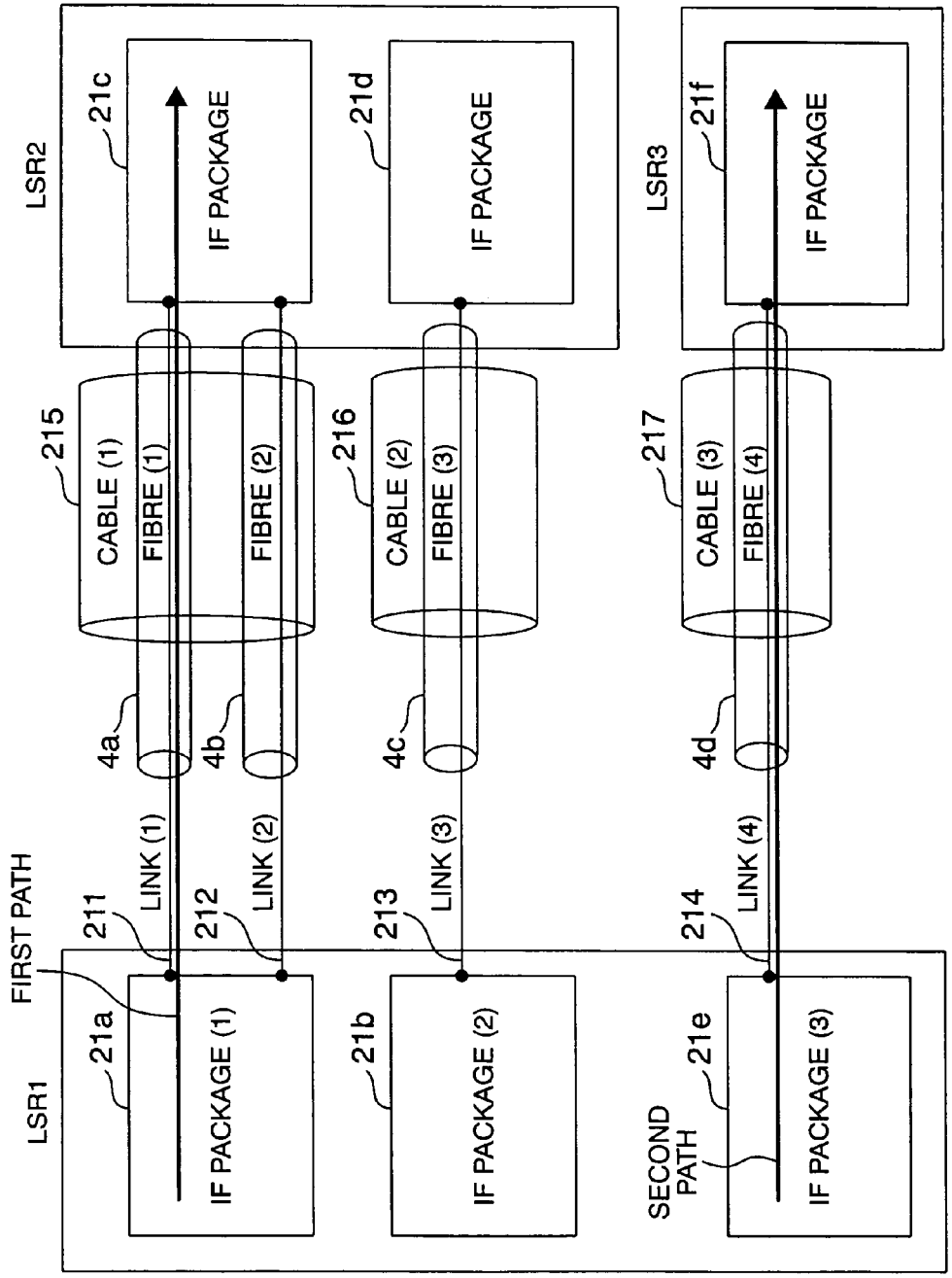
FIG. 20 is an explanatory view of a shared risk according to Embodiment 5 of the present invention.

It has been described in the above-described embodiment that there is one link between the individual LSRs. But, as shown in FIG. 20, if there are plural links between LSRs and even if a given link becomes a restricted link, there is an occasion that it becomes possible to pass through another link of the same LSR. There may also be an occasion that another selectable link which can configure a route with the same number of hops with another LSR is present.

For example, cables 215, 216, fibers 22a to 22d, interface packages 21a to 21d within the LSR and access point LSRs which are used by individual links are different in FIG. 20.

In such a case, it is also possible to select a link considering a risk which may occur depending on whether a failure which occurs between LSRs has occurred in a cable or a fiber. Besides, where plural paths are generated between the same user sites, it is desirable for the first path and the second path to select another link with a different link group (called as the shared risk link group) which is affected by the same failure.

To achieve the above, topology DB 36 of LSR and LER in this embodiment holds a link control table for controlling a shared risk link group for each link.

FIG. 21 shows a structure of the link control table. It is comprised of areas 221 to 225 to set a link ID, an access point LSR, an interface package number, a cable number and a fiber number.

The route control section 33 refers to the link control table if there are plural next links which can be selected, and a route with the least shared risk is selected on the basis of an interface package number, a cable number and a fiber number.

It is assumed in FIG. 20 that the first path is generated using a link (1), and the link (1) is designated for the restricted link at the time of generation of the second path. In this case, links (2), (3), (4) are present as the routes, and the route control section 33 selects as the next link the link (4) with different access point LSR, interface packages 21a to 21f, cables 215, 216, 217 and fibers 4a to 4d.

By processing as described above, a path with risk spread furthermore can be generated.

Embodiment 6

An embodiment of a GMPLS network will be described.

Figure 22:
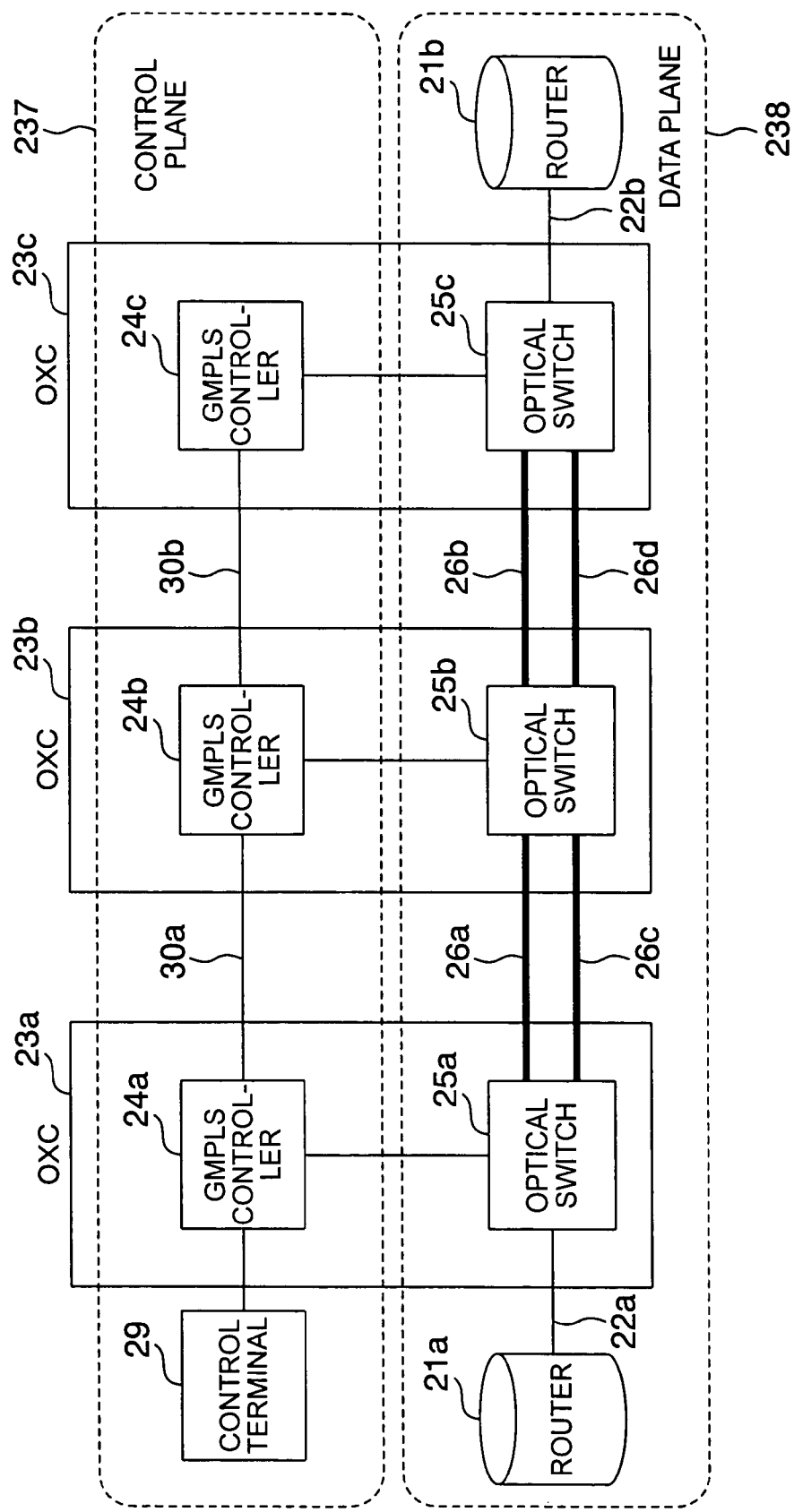
FIG. 22 is a configuration of a GMPLS network according to Embodiment 6 of the present invention.

FIG. 22 shows a structure of the GMPLS network. The GMPLS network is comprised of a two-level hierarchy of a control plane 237, where a GMPLS control signal such as a signaling or routing message flows, and a data plane 238 where a real main signal flows.

Optical cross connects (hereinafter referred to as the OXC) 23a to 23c which can control the route on a wavelength basis are comprised of GMPLS controllers 24a to 24c which control the control plane 237 and optical switches 25a to 25c which control the data plane 238. And, the GMPLS controller 24a has at least a control terminal 29 connected through a dedicated interface or an IP network.

The optical switches 25a to 25c are connected through WDM (Wavelength Division Multiplexing) lines 26a to 26d, and router lines 22a, 22b having interface such as POS (Packet Over SONET) or Gigabit Ethernet are used for connection between the optical switches 25a, 25c and between routers 21a, 21b of the OXCs 23a, 23c. The GMPLS controllers 24a to 24c of the neighboring OXCs 23a to 23c are mutually connected through IP links 30a, 30b.

Upon receiving a path generation request from the control terminal 29, the GMPLS controllers 24a to 24c are decide a used wavelength and a route of the path using the RSVP-TE which is a GMPLS signaling protocol through the IP links 30a, 30b. And, the optical switches 25a to 25c are set on the basis of the information to generate a path having a wavelength as a label.

Figure 23:
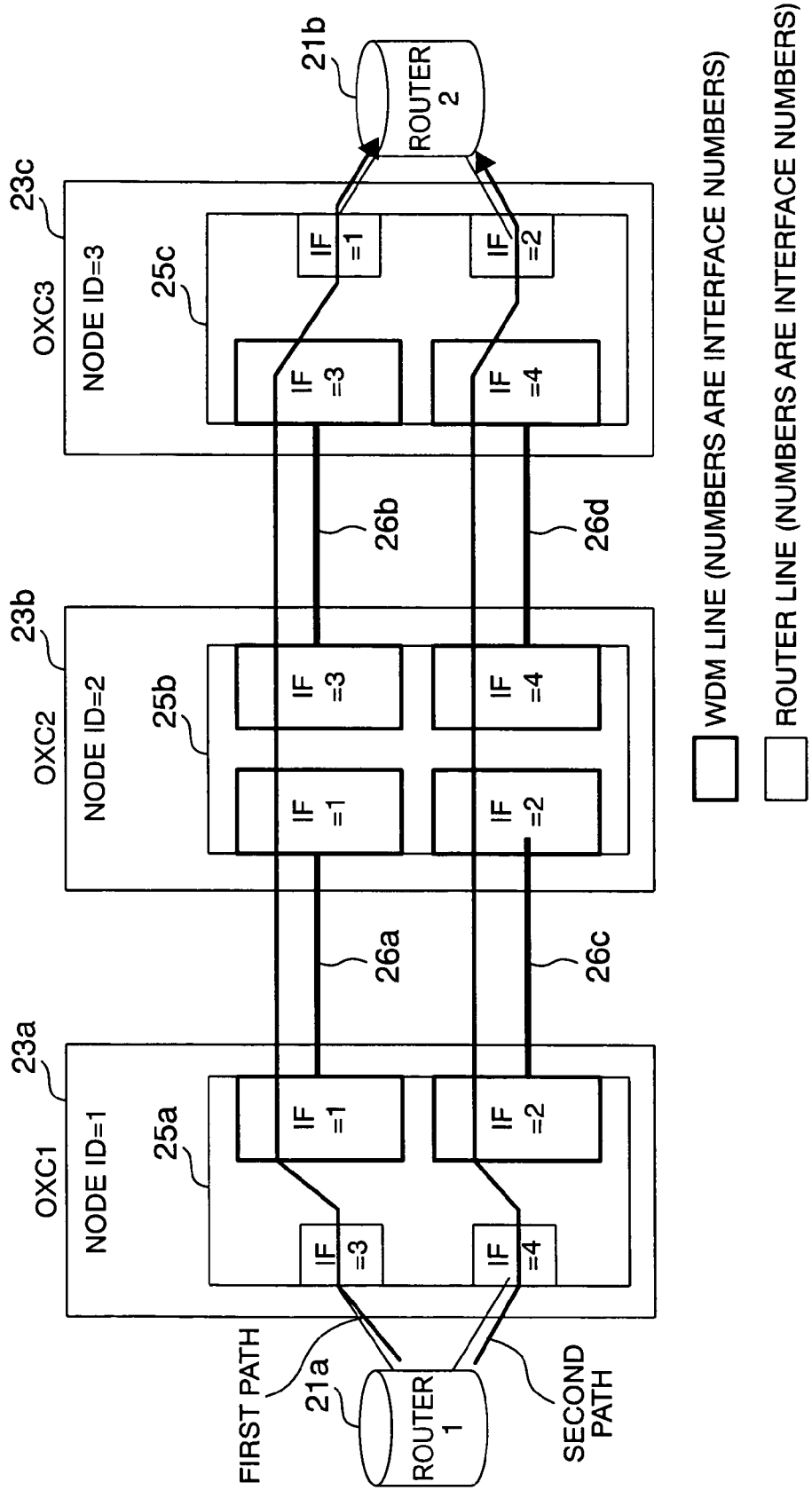
FIG. 23 is a general view of communications by optical switches according to Embodiment 6.

FIG. 23 shows a general view of communications of the optical switches 25a to 25c. The optical switches 25a to 25c are connected with plural WDM lines and router lines. An interface ID is allotted to the WDM lines and the router lines, and a usable wavelength is also allotted for controlling as a label number to the WDM lines.

The optical switch 25b located at a midpoint of the path controls according to instructions from the GMPLS controllers 24a to 24c to transfer the input wavelength (input label) of the designated input interface (input side link) with an output wavelength (output label) of the designated output interface (output side link). The optical switch 25a which becomes the path originating OXC does not have a wavelength of the input side. Therefore, it is not necessary to designate the input wavelength, and the path terminating OXC optical switch 25c does not have a wavelength of the output side. Thus, it is not necessary to designate the output wavelength.

The software configuration and operation of the GMPLS controllers 24a to 24c are basically the same as those of the path control section of Embodiment 1. But, the routing protocol 37 of the individual nodes is expanded for the GMPLS, and the control plane 237 is used to automatically collect topology information of the WDM lines and topology information of the IP link of the control plane. The results are stored in the topology DB 36.

In the same manner as in Embodiment 1, the user uses the control terminal 29 to designate a path input link, destination address and restricted link information to make a path generation request to the GMPLS controller 24a of the path originating OXC.

The GMPLS controllers 24a to 24c refer to the topology DB 36 and select the next link (WDM line) from the destination address and restricted link information to send a PATH message to the GMPLS controllers 24a to 24c of the next OXC. And, the label information which is set in the received RESV message is obtained, the signal from the input link designated by the user is converted into the wavelength indicated by the label, and the optical switches 25a to 25c are set so as to transfer to the next link.

Figure 24:
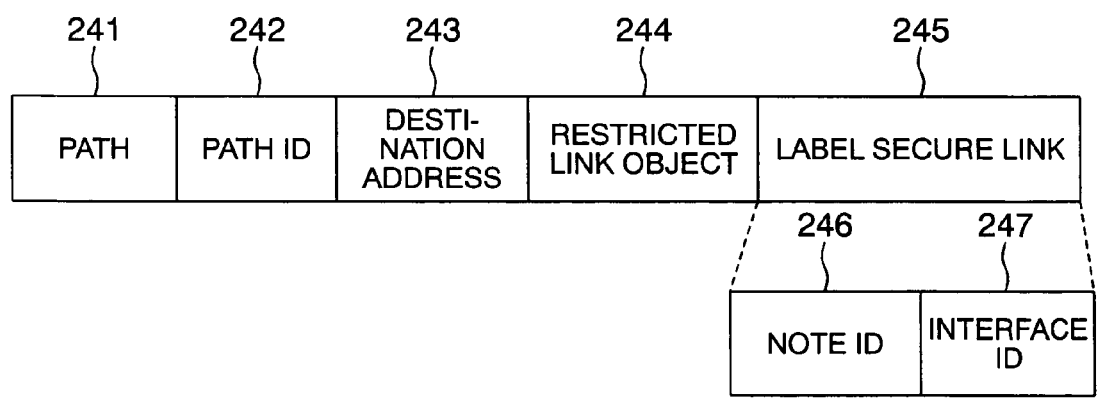
FIG. 24 is a format of a PATH message according to Embodiment 6.

The path is setup on the data plane 238, and the PATH message flows along the conventional IP links 30a, 30b on a different control plane 237. Therefore, as shown in FIG. 24, a field 245 where a node ID and an interface ID (fields 246, 247) of the next OXC are set is added to the PATH message in order to identify the label secure link (the selected next link).

The GMPLS controller 24b of the path intermediate OXC having received the PATH message selects the next link from the destination address and restricted link information and sends PATH message to GMPLS controllers 24a to 24c of the next OXC. And, upon receiving the RESV message, the GMPLS controller 24b secures the label for the link designated by the PATH message and performs settings of the optical switches 25a to 25c.

Specifically, the optical switch is set so as to convert the signal with a wavelength of the secure label of the PATH message designation link into a wavelength indicating the label designated by the RESV message and to transfer it to the next link. After setting the optical switch, the secured label is set in the RESV message, and it is sent to the GMPLS controller which has sent the PATH message.

The GMPLS controller 24c of the path terminating OXC having the link of the destination address secures a label for the link designated by the received PATH message and sets the optical switch 25c to transfer the signal with the wavelength of the secured label from the PATH message designation link to the link of the destination address. And, the secure label is sent in the RESV message, and it is sent to the GMPLS controller 24b which has sent the PATH message.

As shown in FIG. 23, where two wavelength switch paths are to be generated between a router 121a and a router 221b, the WDM lines 26a to 26d can be handled in the same manner as the IP link of Embodiment 1 to control the route. Specifically, in the restricted link object (FIG. 13), the WDM line is defined to the link type (field 145) of the restricted link list 143, and the node ID and the interface ID of the OXC are set in the link identifier (field 147). Thus, the WDM line can be designated as the restricted link.

For example, it is assumed that, the WDM line 26a which is represented by node ID=2 and interface ID=1 and the WDM line 26b which is represented by the node ID=3 and interface ID=3 are selected as the route of the path at the time when the first path is generated.

To generate the second path, information of the WDM line of the above-described first path is designated as the restricted link. Thus, for the route of the path, the WDM line 26c which is represented by node ID=2 and interface ID=2 and the WDM line 26d which is represented by node ID=3 and interface ID=4 different from those of the route of the first path are selected.

As described above, the first paths 26a and 26b and the second paths 26c and 26d have a different route (WDM line) selected and a path generated, so that it becomes possible to generate a path which has a risk at a time of failure dispersed.

Embodiment 7

Another link selection policy of the extreme inhibit level of Embodiment 1 will be described.

In Embodiment 1, the route control section selects a route by comparing all the routes capable of reaching the destination address with the restricted link information. But, in this embodiment, the route control section selects a route by comparing the next link reachable to the destination address with the restricted link information.

The routing protocol 37 controls the output link which is reachable to the destination address and the shortest number of hops when it is assumed that the output link is determined as the next link.

FIG. 25 shows a processing flow of the route control section 33. The link selection policy (steps 154 to 156) of FIG. 14 is replaced with steps 254 to 256. Specifically, it is checked whether the next link which is reachable to the destination address corresponds to the restricted link. If there is a non-corresponding link, the link which provides the shortest hop is selected from the next links which are not restricted links (steps 254, 256). If all the reachable next links correspond to the restricted links, the restricted level is checked, and a route which comes to have the shortest hops is selected in the next link with the extreme inhibit level (steps 254, 255).

Thus, a load which is applied to the selection of a route by the routing protocol 37 can be decreased by simplifying the link selection policy. And, it is not necessary to control all routes reachable to the destination address, and a load to the routing protocol 37 can also be reduced in comparison with Embodiment 1.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A path control method for route-controlling a label switch path generated in a network having a plurality of nodes, the network including a routing area 0 where a path originating node is present, and another routing area 1, the path control method comprising operations of:

at the path originating node, computing a route within the routing area 0, attaching the computed route to the label allocation request message as explicit route information, attaching restricted link information to the label allocation request message and sending the information-attached said label allocation request message on the explicit route in the network;

at a transit node which has received the label allocation request message, selecting a link different from a restricted link indicated by the restricted link information attached to the label allocation request message; and sending the label allocation request message from the transmit node to the selected link, at a boundary node, which has received the label allocation request message and connects the routing area 0 and the routing area 1, computing a further route including a link different from the restricted link indicated by the restricted link information;

sending out an updated label allocation request message to which the computed further route information defining the further route is attached as new explicit route information;

at the path originating node and the boundary node, using route information of the switch path as the restricted link information; and wherein either an absolute inhibit level which prohibits passage or an extreme inhibit level which restricts passage according to a prescribed rule determined in advance, is set for the restricted link;

the transit node selects the link according to either of the inhibit levels the restricted link information has a restricted link list which indicates an inhibit level of the restricted link; and the transit node:

selects a link which configures a route with the least number of times of passing through the link indicating an extreme inhibit level when all the restricted link lists indicate an extreme inhibit level;

selects a link which configures a route with a less number of hops when there are plural routes which do not pass through the extreme inhibit link; and selects a link which configures a route with the least number of times of passing through the link indicating the extreme inhibit level among routes which do not pass through a link indicating an absolute inhibit level when there is a link indicating one or more absolute inhibit levels in the restricted link list.

2. A path control method according to claim 1, wherein link identification information and/or label switch path identification information is used as the restricted link information.

3. A path control method according to claim 1, wherein:
the path originating node:
uses a record route object to obtain route information of a primary path generated between the path originating node and a designated path terminating node; and
uses route information of a primary path to generate a secondary path as restricted link information when the secondary path, which passes through a route different from the primary path, is generated between the path originating node and the path terminating node.

4. A path control method according to claim 1, wherein an IP address for specifying the transit node to which a formed IP link is connected or a path ID for specifying a path formed between transit nodes by tunneling, is used as the restricted link information.

5. A path control method according to claim 1, wherein:
the transit node holds shared risk link group information which indicates shared risk possessed by a plurality of links formed between the nodes;
the transit node refers to the shared risk link group information when there are plural links which do not pass through the restricted link; and
a link with a less shared risk with the restricted link is selected.

6. A path control method according to claim 1, wherein:
the node is an optical cross connect which can control a route on a wavelength basis;
the network is a GMPLS (Generalized Multi Protocol Label Switching) network which connects the optical cross connect through a WDM (Wavelength Divison Multiplexing) line; and
a node ID for specifying the optical cross connect and an interface ID for specifying the WDM line are used as information for specifying the link.

7. A path control method according to claim 1, wherein:
the restricted link information has a restricted link list which indicates the restricted link inhibit level; and
the path transit node selects a link, which configures a route which becomes the minimum number of hops, among links indicating the extreme inhibit level when all links reachable to a destination address are designated by the restricted link information.

* * * * *